(12) United States Patent
Takahashi

(10) Patent No.: US 10,270,960 B2
(45) Date of Patent: Apr. 23, 2019

(54) IMAGE PICKUP CONTROL APPARATUS BY WHICH A USER CAN SELECT INSTANT-SHUTTER FUNCTION OR A SELF-TIMER FUNCTION WHEN TAKING A SELFIE

(71) Applicant: SONY CORPORATION, Tokyo (JP)

(72) Inventor: Masahiro Takahashi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/321,219

(22) PCT Filed: May 18, 2015

(86) PCT No.: PCT/JP2015/002480
§ 371 (c)(1),
(2) Date: Dec. 22, 2016

(87) PCT Pub. No.: WO2016/006149
PCT Pub. Date: Jan. 14, 2016

(65) Prior Publication Data
US 2017/0155822 A1   Jun. 1, 2017

(30) Foreign Application Priority Data
Jul. 8, 2014 (JP) .................. 2014-140359

(51) Int. Cl.
*H04N 5/232* (2006.01)
*G06F 3/0481* (2013.01)
*H04N 5/225* (2006.01)

(52) U.S. Cl.
CPC ..... *H04N 5/23216* (2013.01); *G06F 3/04812* (2013.01); *H04N 5/2259* (2013.01); *H04N 5/23245* (2013.01); *H04N 5/23293* (2013.01)

(58) Field of Classification Search
CPC ........... H04N 5/23216; H04N 5/23293; H04N 5/23245; H04N 5/2259; G06F 3/04812
See application file for complete search history.

(56) References Cited

U.S. PATENT DOCUMENTS 9,001,253 B2 *  4/2015  Maeda ............... H04N 5/23216
                                                348/207.99
2006/0072028 A1   4/2006  Hong
(Continued)

FOREIGN PATENT DOCUMENTS

CN          1755595 A       4/2006
CN        101567974 A      10/2009
(Continued)

OTHER PUBLICATIONS

Office Action for JP Patent Application No. 2016532408, dated Nov. 7, 2017, 05 pages of Office Action and 03 pages of English Translation.
(Continued)

*Primary Examiner* — Luong T Nguyen
(74) *Attorney, Agent, or Firm* — Chip Law Group

(57) ABSTRACT

[Object] To provide a technology such as an image pickup control apparatus, by which the user can immediately and intuitively select whether to perform image pickup using an instant-shutter function or to perform image pickup using a self-timer function when taking a selfie. [Solving Means] An image pickup control apparatus according to the present technology includes a control unit. The control unit displays an image pickup guide including a first object, a second object, and a third object on a screen of a display unit, makes a determination as to detection of user's operations on the first object, the second object, and the third object, causes, when the user's operation on the first object has been detected, the image pickup unit to perform image pickup, causes, when the user's operation on the second object has
(Continued)

been detected, the image pickup unit to perform image pickup after a first time elapses after the user's operation is detected, and causes, when the user's operation on the third object has been detected, the image pickup unit to perform image pickup after a second time different from the first time elapses after the user's operation on the third object is detected.

16 Claims, 11 Drawing Sheets

(56) References Cited

U.S. PATENT DOCUMENTS

| | | | |
|---|---|---|---|
| 2010/0026830 A1 | 2/2010 | Kim | |
| 2011/0221948 A1* | 9/2011 | Saito | G06F 3/0488 348/333.01 |
| 2012/0236173 A1* | 9/2012 | Telek | G03B 17/08 348/223.1 |
| 2013/0215313 A1* | 8/2013 | Maeda | H04N 5/23216 348/333.02 |
| 2014/0109024 A1* | 4/2014 | Miyazaki | G06F 3/04883 715/863 |
| 2014/0253799 A1* | 9/2014 | Moon | H04M 1/0264 348/376 |
| 2014/0327794 A1* | 11/2014 | Saito | G06F 3/0488 348/223.1 |
| 2015/0381895 A1* | 12/2015 | Mei-Ling | H04N 5/23293 348/239 |
| 2017/0212667 A1 | 7/2017 | Miyazaki | |

FOREIGN PATENT DOCUMENTS

| | | |
|---|---|---|
| CN | 201821414 U | 5/2011 |
| CN | 102880406 A | 1/2013 |
| DE | 102009027848 A1 | 2/2010 |
| EP | 2732366 A1 | 5/2014 |
| EP | 3168733 A1 | 5/2017 |
| GB | 2467391 A | 8/2010 |
| JP | 2004-343653 A | 12/2004 |
| JP | 2010-067260 A | 3/2010 |
| JP | 2011-193249 A | 9/2011 |
| JP | 2013-025357 A | 2/2013 |
| JP | 2013-058958 A | 3/2013 |
| JP | 2013-172282 A | 9/2013 |
| JP | 2013-219537 A | 10/2013 |
| JP | 2014-067457 A | 4/2014 |
| KR | 10-2006-0029353 A | 4/2006 |
| KR | 10-2010-0013701 A | 2/2010 |
| WO | 2012/125383 A1 | 9/2012 |
| WO | 2013/011651 A1 | 1/2013 |

OTHER PUBLICATIONS

Extended European Search Report of EP Patent Application No. 15818961.3, dated Jan. 26, 2018, 08 pages.

Office Action for JP Patent Application No. 2016-532408, dated Apr. 10, 2018, 05 pages of Office Action and 03 pages of English Translation.

Office Action for CN Patent Application No. 201580035665.9, dated Jan. 28, 2019, 06 pages of Office Action and 11 pages of English Translation.

* cited by examiner

IMAGE PICKUP CONTROL APPARATUS BY WHICH A USER CAN SELECT INSTANT-SHUTTER FUNCTION OR A SELF-TIMER FUNCTION WHEN TAKING A SELFIE

CROSS REFERENCE TO RELATED APPLICATIONS

This application is a U.S. National Phase of International Patent Application No. PCT/JP2015/002480 filed on May 18, 2015, which claims priority benefit of Japanese Patent Application No. JP 2014-140359 filed in the Japan Patent Office on Jul. 8, 2014. Each of the above-referenced applications is hereby incorporated herein by reference in its entirety.

TECHNICAL FIELD

The present technology relates to a technology such as an image pickup control apparatus that causes an image pickup unit to perform image pickup.

BACKGROUND ART

Conventionally, a method for a photograph you take of yourself with a portable terminal (e.g., mobile telephone) including an image sensor or with an image pickup apparatus such as a digital camera has been widely known. Such a photograph is called selfie.

When a user takes a selfie, the user generally takes a selfie by holding an image pickup apparatus in his or her hand and pressing a shutter button while checking a live view image displayed on a display unit. In recent years, such a style for taking selfies is becoming globally popular, in particular, among young women.

A portable terminal is generally equipped with a camera (sub-camera) at an upper position of a display unit. This camera is used for taking a selfie. However, since the display unit of the digital camera is generally located on an opposite side of an image pickup unit, it is difficult for the user to take a selfie while checking a live view image displayed on the display unit as long as such a positional relationship between the display unit and the image pickup unit is kept. In view of this, a method of rotating the display unit by 180 degrees for directing the display unit to the image pickup unit is sometimes used (e.g., see Patent Literature 1).

In general, for taking a selfie, in addition to a method of performing image pickup when a shutter button is pressed (instant-shutter function), a method of performing image pickup when a timer counts down to zero (self-timer function) is used (e.g., see Patent Literature 2).

CITATION LIST

Patent Literature

Patent Literature 1: Japanese Patent Application Laid-open No. 2013-219537
Patent Literature 2: Japanese Patent Application Laid-open No. 2004-343653

DISCLOSURE OF INVENTION

Technical Problem

In recent years, a method of displaying a shutter button that is a GUI (Graphical User Interface) on a screen instead of the mechanical shutter button is sometimes used. The user can take an image by touching a position at which the shutter button is displayed on the display unit.

However, for setting the self-timer function, the user is required to perform many steps, for example, opening a menu screen and then determining whether or not to activate the self-timer function on the menu screen and setting a count period for the self-timer function.

Therefore, there is a problem in that the user cannot immediately and intuitively select whether to perform image pickup using the instant-shutter function or image pickup using the self-timer function.

In view of the above-mentioned circumstances, it is an object of the present technology to provide a technology such as an image pickup control apparatus, by which the user can immediately and intuitively select whether to perform image pickup using an instant-shutter function or image pickup using a self-timer function when taking a selfie.

Solution to Problem

An image pickup control apparatus according to the present technology includes a control unit.

The control unit displays an image pickup guide including a first object, a second object, and a third object on a screen of a display unit, makes a determination as to detection of user's operations on the first object, the second object, and the third object, causes, when the user's operation on the first object has been detected, the image pickup unit to perform image pickup, causes, when the user's operation on the second object has been detected, the image pickup unit to perform image pickup after a first time elapses after the user's operation is detected, and causes, when the user's operation on the third object has been detected, the image pickup unit to perform image pickup after a second time different from the first time elapses after the user's operation on the third object is detected.

The "user's operation" includes operations (touch operation, flick operation, etc.) with respect to the screen of the display unit and gesture operations (gesture operations utilizing hands or line of sight) at a position spaced away from the screen (the same applies to "predetermined user's operation" to be described later).

In the image pickup control apparatus according to the present technology, the user can perform image pickup (take a selfie) using an instant-shutter function by performing the user's operation on the first object out of the three objects displayed on the screen. Further, the user can perform image pickup (take a selfie) using a cell-timer function by performing the user's operation on the third object out of the three objects displayed on the screen.

With this, when taking a selfie, the user can immediately and intuitively select whether to perform image pickup using the instant-shutter function or image pickup using the self-timer function. In addition, in the image pickup control apparatus, different count periods (first time, second time) are used when the user's operation on the second object is performed and the operation on the third object is performed. Therefore, the user can also immediately and intuitively select a count period associated with the self-timer function.

In the image pickup control apparatus, the image pickup guide may include the first object, the second object, and the third object in a circumference of a circle or a circular arc corresponding to a reference point set within the screen.

In the image pickup control apparatus, the control unit may determine, when a user's operation from the reference point toward the first object has been detected, that the user's operation on the first object has been detected, determine, when a user's operation from the reference point toward the second object has been detected, that the user's operation on the second object has been detected, and determine, when a user's operation from the reference point toward the third object has been detected, that the user's operation on the third object has been detected.

With this, the user can select an arbitrary object by performing the user's operation from the reference point toward each of the arranged objects. With this, the operation intuitiveness is further enhanced.

In the image pickup control apparatus, the control unit may determine whether or not the predetermined user's operation has been detected, and display the image pickup guide on the screen when the predetermined user's operation has been detected.

With this, the user can display the image pickup guide on the screen depending on needs on the screen.

In the image pickup control apparatus, the control unit may determine, when the predetermined user's operation has been detected, a position within the screen at which the predetermined user's operation has been detected, and set the reference point to position at which the predetermined user's operation has been detected.

With this, by performing the predetermined user's operation, the user can display the image pickup guide at a position thereof.

In the image pickup control apparatus, the control unit may change a display mode of the image pickup guide according to a position within the screen at which the predetermined user's operation has been detected.

With this, irrespective of which position on the screen the position at which the predetermined user's operation has been performed is, the user can be provided with a stable operability.

In the image pickup control apparatus, the control unit may display the image, which is captured by the image pickup unit, on the screen as the live view image, and display the image pickup guide superimposed on the live view image.

With this, the user can adjust the angle of view while viewing the live view image.

In the image pickup control apparatus, the control unit may control the image pickup unit to focus on a position of a subject in the live view image, the position corresponding to a position within the screen at which the predetermined user's operation has been detected.

With this, the user can focus on a position of an arbitrary object by performing the predetermined user's operation.

In the image pickup control apparatus, the image pickup guide may include a fourth object.

In this case, the control unit may make a determination as to detection of the user's operation on the fourth object, and cause, when the operation on the fourth object has been detected, the image pickup unit to continuously perform image pickup in a first time duration.

With this, the user can perform image pickup using a continuous-shooting function by performing the user's operation on the fourth object.

In the image pickup control apparatus, the control unit may display a facial expression/pose guide on the screen, the facial expression/pose guide guiding the user for at least one of a facial expression and a pose within the first time duration.

With this, the user can take a selfie in accordance with the facial expression/pose guide.

In the image pickup control apparatus, the image pickup guide may include a fifth object.

In this case, the control unit may make a determination as to the user's operation on the fifth object, and cause, when the user's operation on the fifth object has been detected, the image pickup unit to continuously perform image pickup in a second time duration different from the first time duration.

With this, the user can immediately and intuitively select the duration for image pickup using the continuous-shooting function.

In the image pickup control apparatus, the image pickup guide may include a sixth object.

In this case, the control unit may determine whether or not a user's operation on the sixth object has been detected, and cause, when an operation on the sixth object has been detected, the image pickup unit to perform image pickup while causing a flashlight to emit light.

With this, the user can perform image pickup using a flash image pickup function by performing the user's operation on the sixth object.

An image pickup control method according to the present technology includes displaying an image pickup guide including a first object, a second object, and a third object on a screen of a display unit.

A determination as to detection of user's operations on the first object, the second object, and the third object is made.

When the user's operation on the first object has been detected, the image pickup unit performs image pickup.

When the user's operation on the second object has been detected, the image pickup unit performs image pickup after a first time elapses after the user's operation is detected.

When the user's operation on the third object has been detected, the image pickup unit performs image pickup after a second time different from the first time elapses after the user's operation on the third object is detected.

A program according to the present technology causes an image pickup control apparatus to execute the steps:

displaying an image pickup guide including a first object, a second object, and a third object on a screen of a display unit;

making a determination as to detection of user's operations on the first object, the second object, and the third object;

causing, when the user's operation on the first object has been detected, the image pickup unit to perform image pickup;

causing, when the user's operation on the second object has been detected, the image pickup unit to perform image pickup after a first time elapses after the user's operation is detected; and causing, when the user's operation on the third object has been detected, the image pickup unit to perform image pickup after a second time different from the first time elapses after the user's operation on the third object is detected.

Advantageous Effects of Invention

As described above, in accordance with the present technology, it is possible to provide a technology such as an image pickup control apparatus, by which the user can immediately and intuitively select whether to perform image pickup using an instant-shutter function or image pickup using a self-timer function when taking a selfie.

MODE(S) FOR CARRYING OUT THE INVENTION

Hereinafter, embodiments according to the present technology will be described with reference to the drawings.

First Embodiment

[Overall Configuration of Digital Camera 100 and Configurations of Respective Units]

Figure 1:
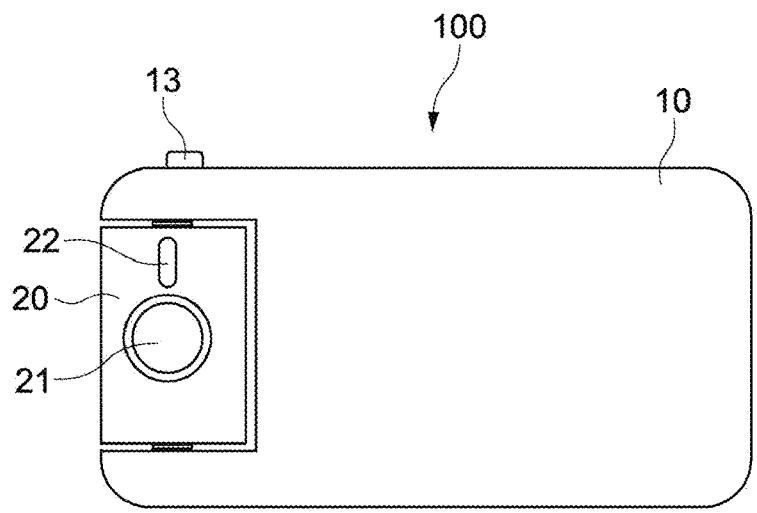
FIG. 1 A front view showing an external configuration of a digital camera according to an embodiment of the present technology.
Figure 2:
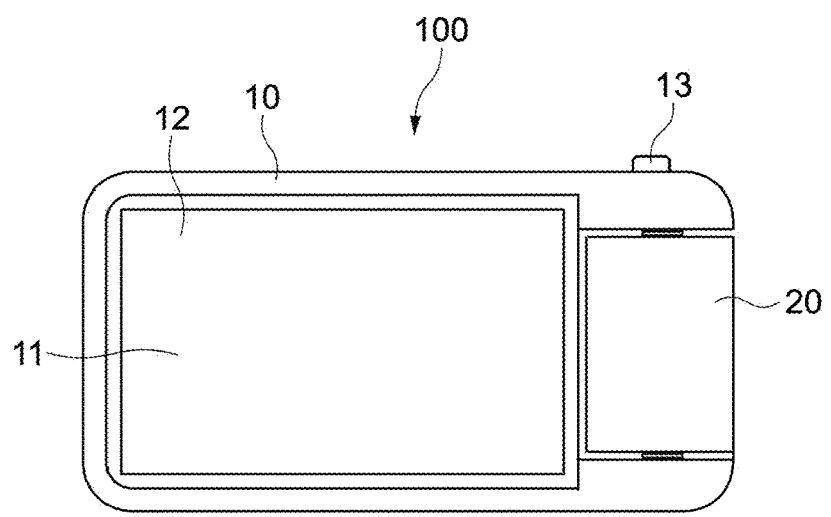
FIG. 2 A rear view showing an external configuration of the digital camera according to the embodiment of the present technology.

FIG. 1 is a front view showing an external configuration of a digital camera 100 according to a first embodiment of the present technology. FIG. 2 is a rear view showing an external configuration of the digital camera 100. The digital camera 100 (image pickup control apparatus) according to this embodiment is a digital still camera capable of capturing still images. Note that the digital camera 100 can also be configured to be capable of capturing moving images in addition to the still images.

As shown in FIGS. 1 and 2, the digital camera 100 is set to have a size such that the user can hold it with one hand in order to make it easy for the user to carry it and take images. The digital camera 100 has a rectangular plate like shape as a whole. The digital camera 100 includes a digital camera main body 10 and a rotator 20. The rotator 20 is provided rotatably relative to the digital camera main body 10.

A display unit 11 is provided on a back side of the digital camera main body 10. The display unit 11 is constituted of a liquid-crystal display or an organic EL (EL: Electro luminescence) display, for example.

A touch sensor 12 is provided on a screen of the display unit 11. The touch sensor 12 detects contact with user's fingers. The touch sensor 12 forms a part of an operation unit 15 that inputs user's operations. Examples of a system for the touch sensor 12 can include a capacitance system and a resistance film system. However, the system for the touch sensor 12 is not particularly limited thereto.

Further, a shutter button 13 is mounted on a side surface of the digital camera main body 10. The shutter button 13 is the operation unit 15 for recording image data as still-image data.

The rotator 20 is provided rotatably relative to the digital camera main body 10 about an axis in a Z-direction (short-side direction). The rotator 20 includes an image pickup unit 21 and a flashlight 22. The flashlight 22 is a member that emits light to a subject in a dark place.

Figure 3:
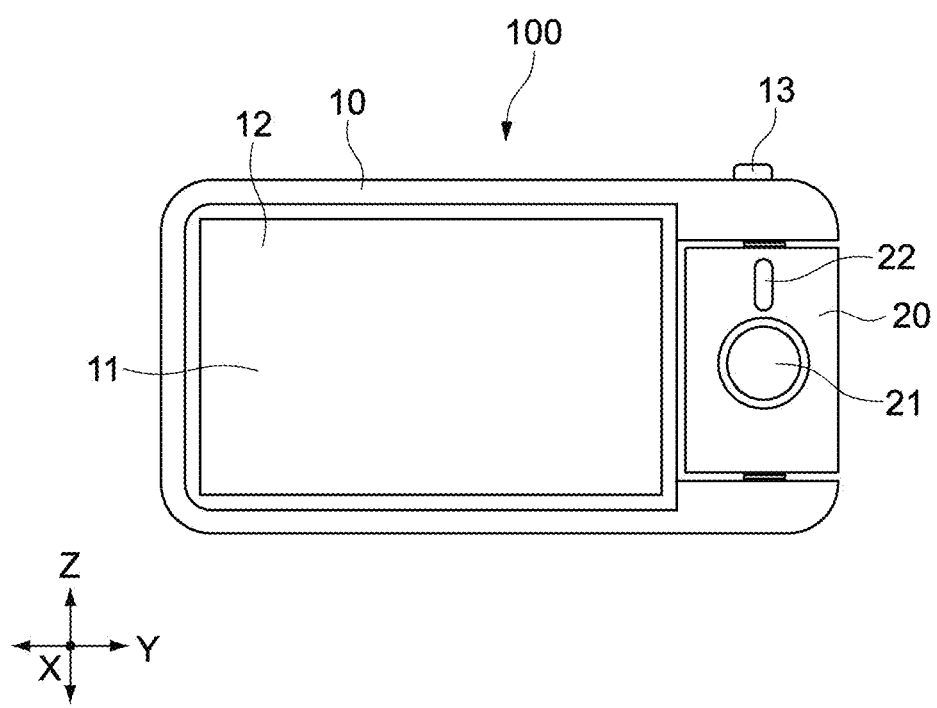
FIG. 3 A view showing a state obtained when a display unit and an image pickup unit are arranged on the same side.

The digital camera 100 is set to be capable of arbitrarily switching between a state in which the display unit 11 and the image pickup unit 21 are arranged on opposite sides and a state in which the display unit 11 and the image pickup unit 21 are arranged on the same side, by rotating the rotator 20 by 180 degrees. FIG. 3 shows a state obtained when the display unit 11 and the image pickup unit 21 are arranged on the same side.

Note that, although the case where the rotator 20 is rotatable about the axis in the Z-direction in the examples shown in FIGS. 1 to 3, the rotator 20 may be configured to be rotatable about an axis in a Y-direction (long-side direction).

Typically, when the digital camera 100 is used in a way similar to a normal camera for taking a photograph of a landscape spread in front of the user or a person located in front of the user, for example, the user uses the digital camera 100 with the display unit 11 and the image pickup unit 21 being arranged on the opposite sides (see FIGS. 1, 2). On the other hand, when taking a selfie, the user arranges the display unit 11 and the image pickup unit 21 on the same side and takes it (see FIG. 3).

Note that, when the display unit 11 and the image pickup unit 21 are arranged on the opposite sides, the digital camera 100 sets an image pickup mode to a standard image pickup mode. On the other hand, when the display unit 11 and the image pickup unit 21 are arranged on the same side, the digital camera 100 sets the image pickup mode to a selfie mode.

Only the shutter button 13 and the touch sensor 12 of the operation unit 15 are shown in the examples of FIGS. 1 to 3. However, the operation unit 15 includes various operation units 15 such as a power supply switch, a menu button, a D-pad, and a determination button.

The power supply switch is an operation unit 15 for switching ON/OFF the power of the digital camera 100. Further, the menu button is an operation unit 15 for displaying a menu screen on the display unit 11. The D-pad is an operation unit 15 for moving a cursor on the menu screen. The determination button is an operation unit 15 for determining an item selected by the cursor.

Note that, although not shown in FIGS. 1 to 3, the digital camera 100 is provided with a movable stand. The movable stand is used when the digital camera is placed in an arbitrary position (e.g., on a table) for taking a selfie.

Figure 4:
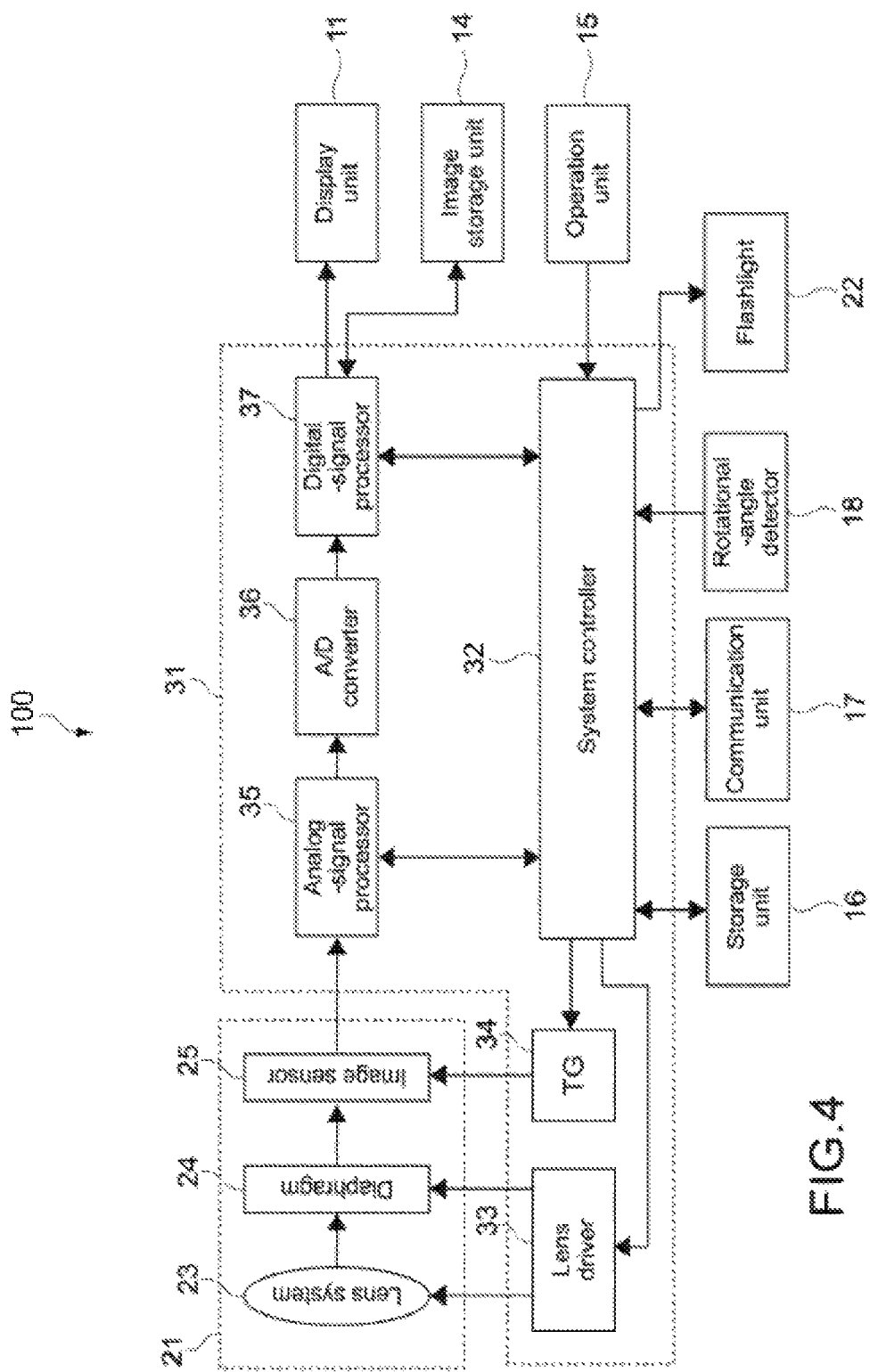
FIG. 4 A functional block diagram showing an internal configuration of the digital camera.

FIG. 4 is a functional block diagram showing an internal configuration of the digital camera 100. As shown in FIG. 4, the digital camera 100 includes the image pickup unit 21, a control unit 31, the display unit 11, an image storage unit 14, the operation unit 15, a storage unit 16, a communication unit 17, a rotational-angle detector 18, and the flashlight 22.

The image pickup unit 21 includes a lens system 23, a diaphragm 24, and an image sensor 25. The control unit 31 includes a system controller 32, a lens driver 33, a timing generator (TG) 34, an analog-signal processor 35, an A/D converter 36, and a digital-signal processor 37.

The lens system 23 includes various lenses such as a zoom lens and a focus lens. The lens system 23 forms an image of subject light on a light-exposure surface of the image sensor 25 through those lenses. The diaphragm 24 is configured to be capable of mechanically adjusting the amount of subject light by adjusting a degree of opening. In the example shown in FIG. 1, the diaphragm 24 is located behind the lens system 23. However, the diaphragm 24 may be located in an optical path (e.g., between the zoom lens and the focus lens) within the lens system 23.

The lens driver 33 controls positions of the zoom lens and the focus lens according to an instruction from the system controller 32 or controls the degree of opening of the diaphragm 24.

The image sensor 25 is constituted of a CMOS (Complementary Metal Oxide Semiconductor) sensor, a CCD (Charge Coupled Device) sensor, or the like. The image sensor 25 includes a plurality of pixels (R-pixel, G-pixel, B-pixel). The image sensor 25 converts subject light incident upon the light-exposure surface into an electronic signal by subjecting it to photoelectric conversion for each pixel. The image sensor 25 outputs the obtained three-primary color signals (R, G, B) to the analog-signal processor 35 as analog image data.

The timing generator 34 (TG) generates a driving pulse necessary for driving the image sensor 25 according to an instruction from the system controller 32 and supplies it to the image sensor 25. By the image sensor 25 being driven by the timing generator 34, a subject image is captured and an image of the subject image is acquired. Further, an exposure time is controlled by the shutter speed of the image sensor 25 being adjusted by the timing generator 34.

The analog-signal processor 35 executes CDS processing (CDS: Correlated Double Sampling), gain processing, or the like on an image signal output from the image sensor 25.

The A/D converter 36 converts analog image data output from the analog-signal processor 35 into digital image data. The A/D converter 36 outputs it to the digital-signal processor 37.

The digital-signal processor 37 is constituted of, for example, a DSP (digital Signal Processor). The digital-signal processor 37 executes various types of digital signal processing on digital image data output from the A/D converter 36. The various types of digital signal processing include noise cancel processing, white balance adjustment processing, color correction processing, edge enhancement processing, and gamma correction processing. Then, the digital-signal processor 37 outputs the image data, which has been subjected to such processing, to the display unit 11. Further, the digital-signal processor 37 outputs the image data, which has been subjected to the above-mentioned processing, to the image storage unit 14 at an image pickup timing.

Further, the digital-signal processor 37 executes processing for displaying an image pickup guide 1 (see FIG. 9) on the display unit 11 according to an instruction from the system controller 32 on the selfie mode. The image pickup guide 1 is used when taking a selfie.

A live view image, a reproduction image, a menu screen, or the like is displayed on the display unit 11.

The live view image is an image displayed on the display unit 11 for the user to check an angle of view. The live view image is displayed on the screen in such a manner that image data output from the digital-signal processor 37 is displayed in real time. The reproduction image is an image displayed on the display unit 11 for the user to check the captured still image. The reproduction image is displayed on the screen in such a manner that the image stored in the image storage unit 14 as the still image is read out and displayed. The menu screen is displayed on the screen for the user to set various parameters regarding image pickup.

The user can set, on the menu screen, for example, a zoom ratio, a focus position, the degree of opening of the diaphragm 24, the shutter speed, a luminance, a white balance, ON/OFF of the flashlight 22, and the like.

The image storage unit 14 stores image data output from the digital-signal processor 37 and metadata associated with the image data (e.g., data and time when the image data was acquired). The image storage unit 14 is constituted of, for example, a semiconductor memory, an optical disc, or an HD (hard Disc). The image storage unit 14 may be fixed inside the digital camera 100 or may be configured to be mountable on or removable from the digital camera 100.

The system controller 32 is constituted of a CPU (Central Processing Unit), for example. The system controller 32 generally controls the respective units of the digital camera 100. Specific processing of the system controller 32 will be described later in detail in the section of Operation Explanation.

The storage unit 16 includes a nonvolatile memory (e.g., ROM (Read Only memory)) in which various programs necessary for processing of the control unit 31 and various types of data are fixedly stored. Further, the storage unit 16 includes a volatile memory (e.g., RAM (Random Access Memory)) used as a work area of the system controller 32. The above programs may be read out from a portable recording medium such as an optical disc and a semiconductor memory or may be downloaded from a server apparatus in the network.

The communication unit 17 includes a wireless LAN function (e.g., Wi-Fi: wireless fidelity). By using a wireless LAN function of the communication unit 17, the digital camera 100 is capable of sending and receiving information to/from other apparatuses each having wireless LAN function.

The rotational-angle detector 18 detects a rotational angle of the rotator 20 with respect to the digital camera main body 10. The rotational-angle detector 18 outputs the detected rotational angle to the system controller 32. The rotational-angle detector 18 is constituted of a rotary encoder, for example. Regarding the rotational angle, the state (see FIGS. 1 and 2) in which the display unit 11 and the image pickup unit 21 are arranged on the opposite sides is set to a reference (0°). Further, the state (see FIG. 3) in which the display unit 11 and the image pickup unit 21 are arranged on the same side is set to 180 degrees.

[Operation Explanation]

Figure 5:
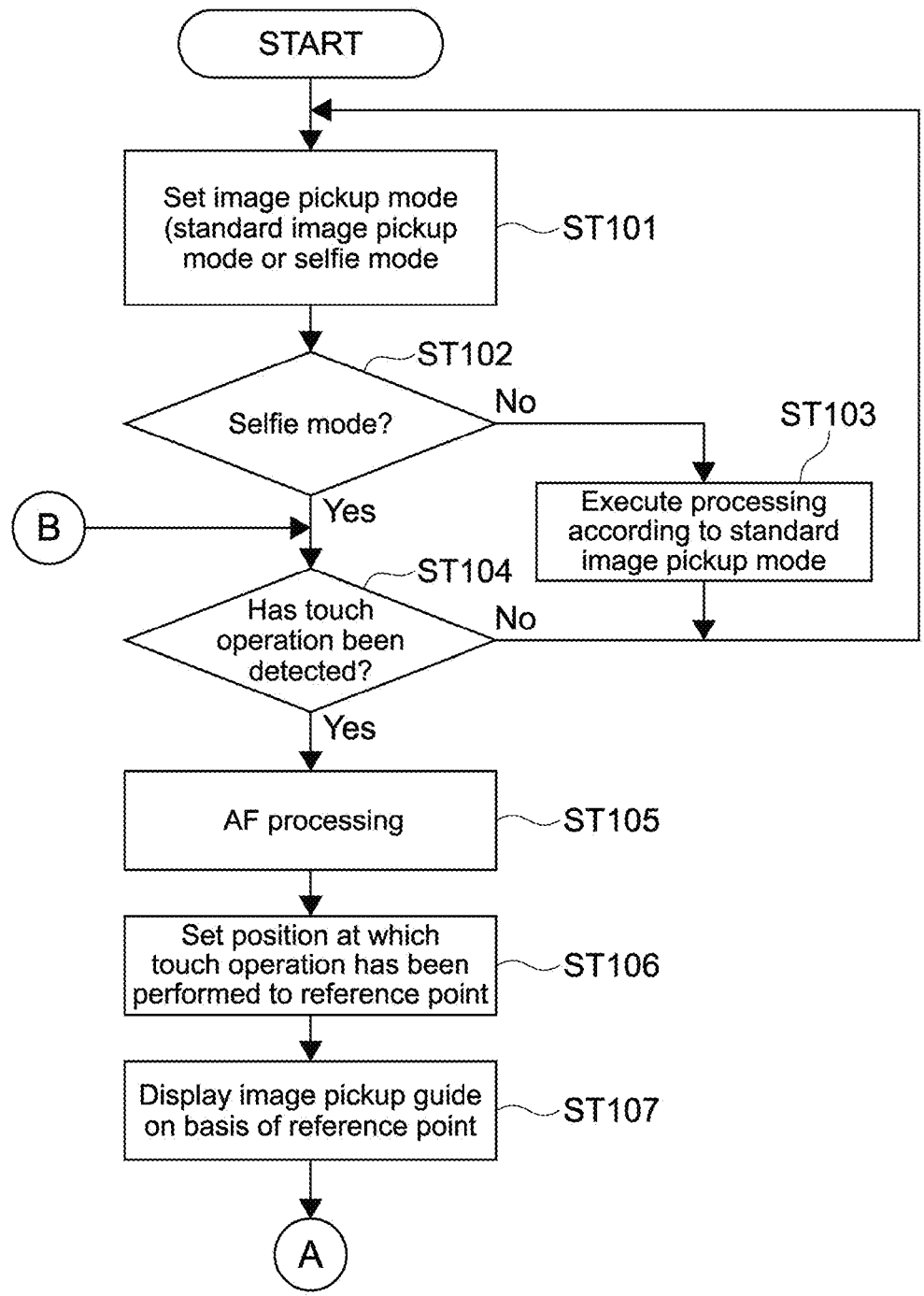
FIG. 5 A flowchart showing processing of the digital camera according to the embodiment of the present technology.
Figure 6:
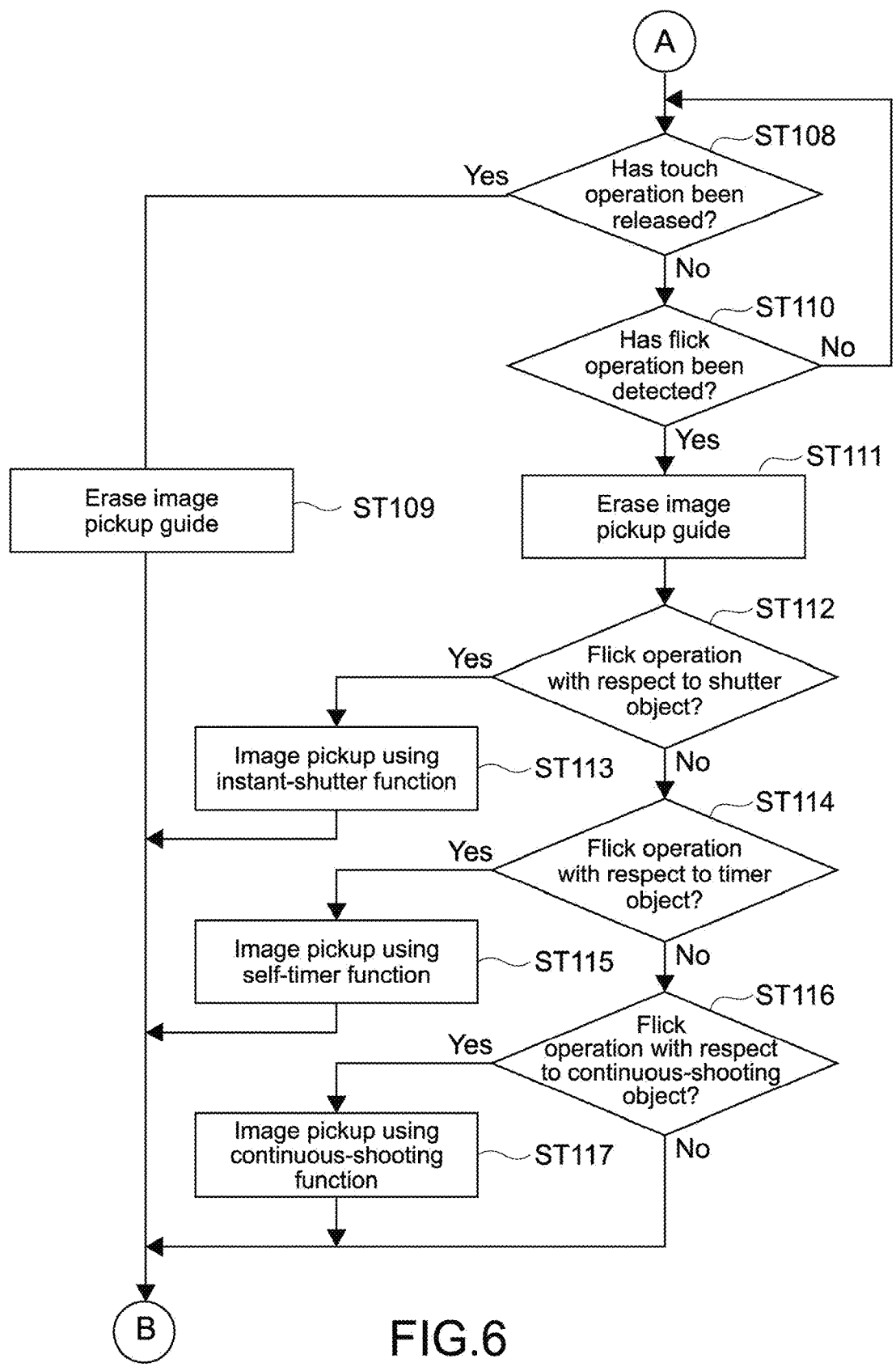
FIG. 6 A flowchart showing processing the digital camera according to the embodiment of the present technology.

Next, processing performed by the digital camera 100 according to the first embodiment will be described specifically. FIGS. 5 and 6 are flowcharts each showing processing of the digital camera 100 according to the first embodiment.

Referring to FIG. 5, first of all, the system controller 32 sets the image pickup mode to the standard image pickup mode or the selfie mode on the basis of information on a rotational angle detected by the rotational-angle detector 18 (Step 101).

Specifically, when the display unit 11 and the image pickup unit 21 are arranged on the opposite sides (see FIGS. 1, 2), the system controller 32 sets the image pickup mode to the standard image pickup mode, on the basis of the information on the rotational angle (0°) from the rotational-angle detector 18. On the other hand, when the display unit 11 and the image pickup unit 21 are arranged on the same side (see FIG. 3), the system controller 32 sets the image pickup mode to the selfie mode on the basis of the information on the rotational angle (by 180 degrees) from the rotational-angle detector 18.

Next, the system controller 32 determines whether or not the current image pickup mode is the selfie mode (Step 102). When the current image pickup mode is not the selfie mode (NO in Step 102), i.e., the current image pickup mode is the standard image pickup mode, the processing based on the standard image pickup mode is executed (Step 103).

On the standard image pickup mode, the image data captured by the image sensor 25 is processed by the analog-signal processor 35, the A/D converter 36, and the digital-signal processor 37 and displayed on the display unit 11 as the live view image. The user adjusts the angle of view and presses the shutter button 13 while checking the live view image.

When the shutter button 13 is pressed, the system controller 32 issues an instruction to the digital-signal processor 37 to output the image data to the image storage unit 14 at a timing when the shutter button 13 was pressed. The image storage unit 14 stores image data output from the digital-signal processor 37 as the still image. On the standard image pickup mode, the still image is captured in this manner. Note that, in the description of this embodiment, the phrase "capturing" the still image means determining arbitrary image data from among image data items used also as the live view image, which have been acquired by the image pickup unit 21, according to an operation on any one of the shutter button 13, objects 2, 3, and (see FIG. 9), and the like on the display unit 11.

Note that, in this embodiment, when the current image pickup mode is the standard image pickup mode, the image pickup guide 1 (see FIG. 9), which will be described later, is not displayed on the screen unlike when the current mode is the selfie mode. It should be noted that, also on the standard image pickup mode, the image pickup guide 1 to be described later may be displayed on the screen or image pickup may be performed according to a user's operation on the image pickup guide 1.

When the current mode is the selfie mode in Step 102 (YES in Step 102), the system controller 32 executes processing of Step 104 and the following steps.

Figure 7:
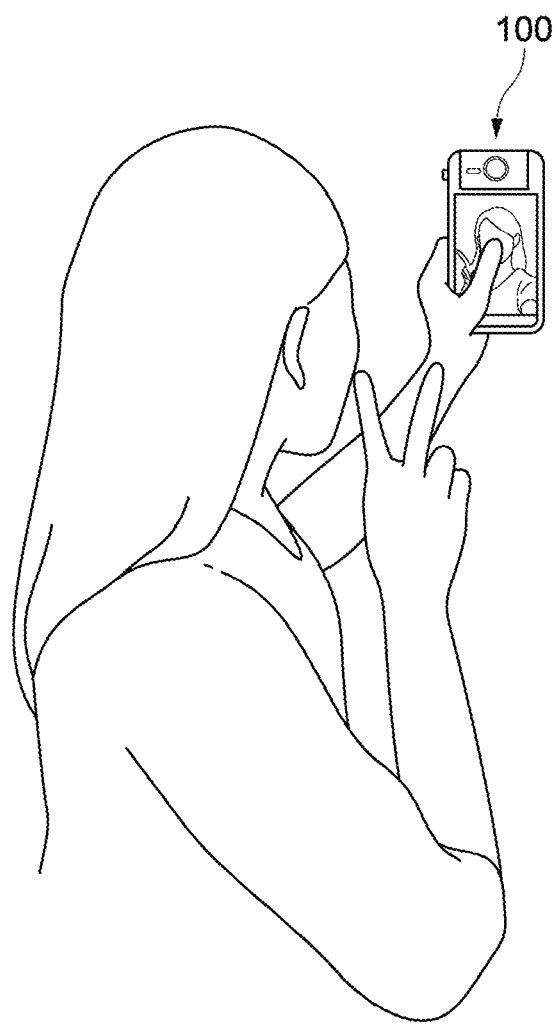
FIG. 7 A view showing a state obtained when the user sets the digital camera to be on a selfie mode and takes a selfie.

FIG. 7 shows a state obtained when the user sets the digital camera 100 to be on the selfie mode and takes a selfie. The example of FIG. 7 shows a state obtained when the user holds the digital camera 100 in the left hand and takes an image of herself in front of the user obliquely from above.

Note that, although a case where the subject is only the user will be described in this embodiment, the user and friends can also be set as subjects, for example.

Referring back to FIG. 5, the system controller 32 determines whether or not a touch operation (predetermined user's operation) with respect to the screen of the display unit 11 has been detected by the touch sensor 12 (Step 104).

Note that, as on the standard image pickup mode, on the selfie mode, image data captured by the image sensor 25 is processed by the analog-signal processor 35, the A/D converter 36, and the digital-signal processor 37 and displayed on the display unit 11 as the live view image in an upper portion thereof. Therefore, also on the selfie mode, the user can adjust the angle of view while checking the live view image.

When the touch operation on the screen has not been detected (NO in Step 104), the system controller 32 returns to Step 101. Then, the system controller 32 sets the image pickup mode to the standard image pickup mode or the selfie mode on the basis of information on a rotational angle detected by the rotational-angle detector 18.

On the other hand, when the touch operation on the screen has been detected (YES in Step 104), the system controller 32 controls the image pickup unit 21 (position of the focus lens) to focus on a position of the subject in the live view image, the position corresponding to the position at which the touch operation has been detected (Step 105).

That is, in Step 105, the system controller 32 executes AF processing (AF: Auto Focus). Although a contrast AF system is typically used for the AF processing, the phase detection AF system may be used. Note that, when the phase detection AF system is used, a mirror and a focus detection sensor are added to the digital camera 100.

Figure 8:
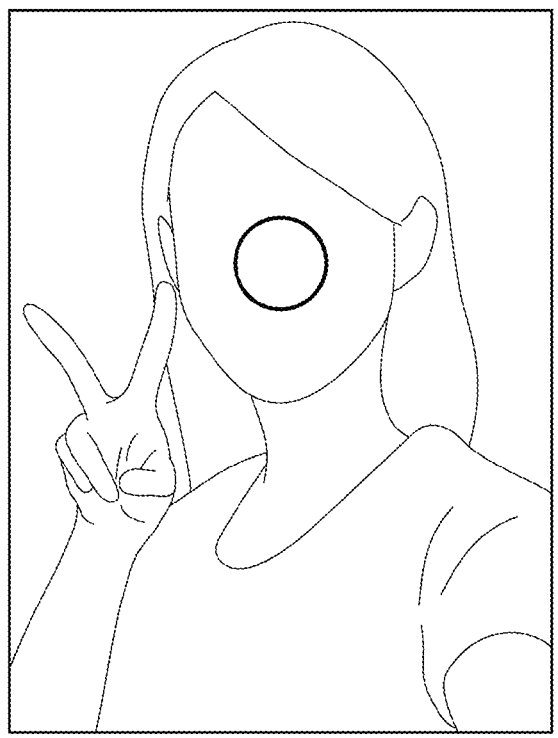
FIG. 8 A view showing a state obtained when focusing on a position of a face.

Referring to FIGS. 7 and 8, the figures each show a state obtained when the user touches a position at which the face is shown with the thumb of the left hand holding the digital camera 100 and the focus is set on the position of the face. In this manner, in this embodiment, the user can focus on a position of an arbitrary object by performing a touch operation on an arbitrary position on the screen.

Referring back to FIG. 5, when executing AF processing, then the system controller 32 sets the position on which the touch operation has been performed, to a reference point (Step 106). Then, on the basis of the reference point, an instruction is issued to the digital-signal processor 37 to display the image pickup guide 1 for taking a selfie on the screen (Step 107). With this, the image pickup guide 1 is displayed superimposed on the live view image on the screen of the display unit 11.

Note that, although the display processing of the image pickup guide 1 is executed after the AF processing in the example here, the display processing of the image pickup guide 1 may be executed in parallel to the AF processing.

Figure 9:
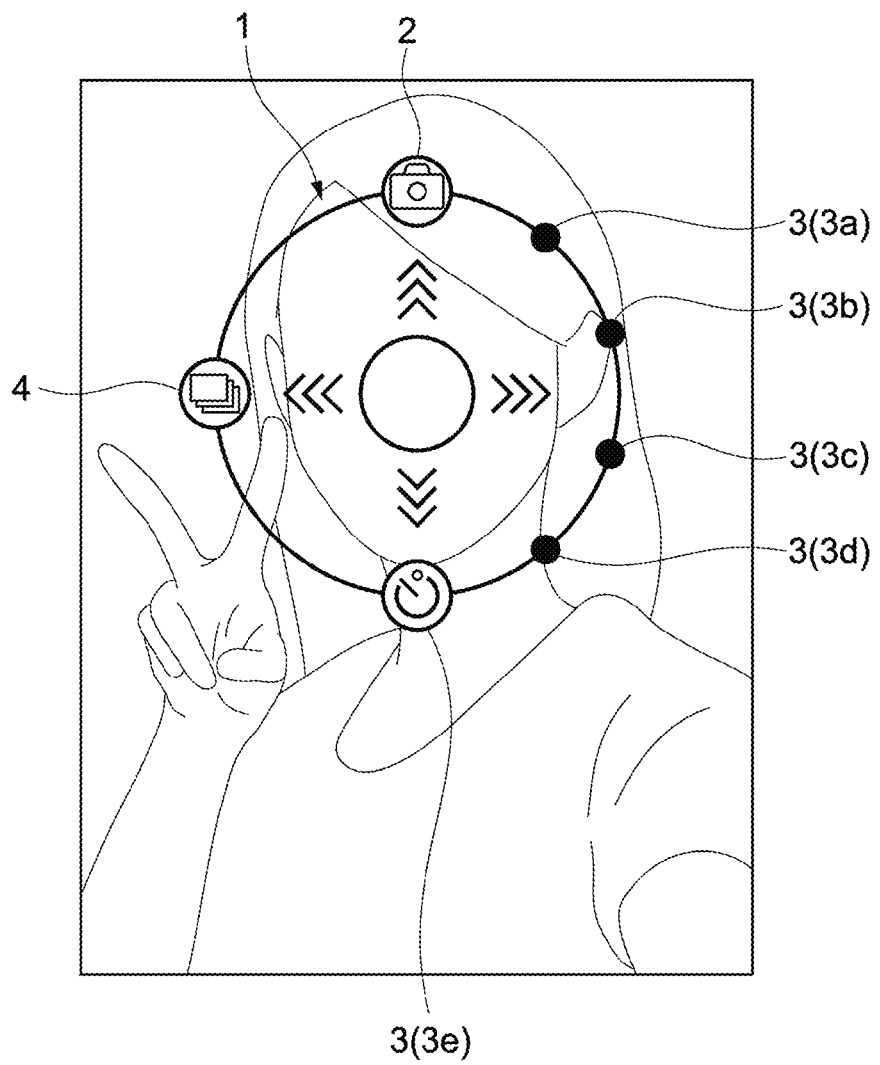
FIG. 9 A view showing an example of an image pickup guide displayed superimposed on a live view image.

FIG. 9 is a view showing an example of the image pickup guide 1 displayed superimposed on the live view image. As shown in FIG. 9, the image pickup guide 1 includes a shutter object 2 (first object), five timer objects 3 (second object, third object), and a continuous-shooting object 4 (fourth object). Here, the objects are user interfaces displayed on the screen. The objects include diagrams, lines, icons, and characters, for example. Further, the object is not limited to viewable objects. For example, the object may be set as a predetermined region of the screen, in which particular display is not performed.

In the example shown in FIG. 9, the objects 2, 3, and 4 are arranged in a circumference with the reference point being a center. Note that the description of the arrangement of the objects will be made assuming that a direction of twelve o'clock in the circumference is 0° and the angle increases in a clockwise direction.

The shutter object 2 is an object for performing image pickup using the instant-shutter function. In the example shown in FIG. 9, the shutter object 2 is located at a position of 0° (position of twelve o'clock) in the circumference of the image pickup guide 1. Further, a diagram of the camera is employed as a diagram of the shutter object 2. Note that any diagram can be employed as the diagram of the shutter object 2 as long as the user can easily consider it as the instant-shutter function.

The five timer objects 3 are objects for performing image pickup using the self-timer function.

In the example shown in FIG. 9, the five timer objects 3 are arranged at equal intervals (36° intervals) from an upper right position to a lower side in the circumference of the image pickup guide 1. Different count periods are assigned to five timer objects 3. The count periods are set to 1 second, 2 seconds, 3 seconds, 4 seconds, and 5 seconds (first time, second time) in the stated order in the clockwise direction.

In the example shown in FIG. 9, black circles are employed as the diagrams of the four timer objects 3 corresponding to the count periods of 1 second to 4 seconds. A diagram of a stopwatch is employed as the diagram of the timer object 3 (object located in position of 6 o'clock) corresponding to the count period of 5 seconds. Note that any diagram can be employed as the diagram of the timer object 3 as long as it is a diagram that the user can easily consider it as the instant-shutter function. For example, each timer object 3 may be a diagram representing the number of seconds.

Note that, in the following description, as the five timer objects have to be particularly distinguished from one another, they will be referred to as first, second, third, fourth, and fifth timer objects 3a, 3b, 3c, 3d, and 3e in the stated order in the clockwise direction.

The continuous-shooting object 4 is an object for performing image pickup using a continuous-shooting function (function of continuously taking images for each predetermined duration). In the example shown in FIG. 9, the continuous-shooting object 4 is located at a position of 270° (position of nine o'clock) in the circumference of the image pickup guide 1. Further, a diagram in which rectangles (diagrams suggestive of photographs) are superimposed on one another is employed as the diagram of the continuous-shooting object 4. Note that any diagram can be employed as the diagram of the continuous-shooting object 4 as long as it is a diagram that the user can easily consider it as the continuous-shooting function.

Further, diagrams of arrow marks are arranged in the image pickup guide 1. The diagrams of the arrow marks extend from the center of the image pickup guide 1 in four upper, lower, left, and right directions. Each of the diagrams of the arrow marks is a diagram for guiding the user to slide the finger in a direction indicated thereby.

Referring to FIG. 6, when displaying the image pickup guide 1 on the screen, then the system controller 32 determines whether or not the touch operation has been released on the basis of an output from the touch sensor 12 (Step 108).

When the touch operation has been released (YES in Step 108), the system controller 32 issues an instruction to the digital-signal processor 37 to erase the image pickup guide 1 from the screen (Step 109). With this, when the user removes the finger from the screen, the image pickup guide 1 is erased from the screen.

That is, by performing a touch operation at an arbitrary position on the screen, the user can display the image pickup guide 1 at the position. By releasing the touch operation, the user can erase the image pickup guide 1 from the screen. In other words, the user can display the image pickup guide 1 on the screen in a manner that depends on needs.

When the image pickup guide 1 is erased from the screen, the system controller 32 returns to Step 104. Then, the system controller 32 determines whether or not the touch operation has been detected again.

When the touch operation has not been released (NO in Step 108), the system controller 32 determines whether or not the flick operation has been detected on the screen on the basis of an output from the touch sensor 12 (Step 110). Here, the flick operation means a user's operation of sliding the finger on the screen and gradually removing the finger from the screen without reducing the speed of slid finger.

When the flick operation has not been detected (NO in Step 110), the system controller 32 returns to Step 108. Then, the system controller 32 determines whether or not the touch operation has been released again.

When the flick operation has been detected (YES in Step 110), the system controller 32 erases the image pickup guide 1 (Step 111). After that, the system controller 32 determines whether or not the flick operation is a flick operation on the shutter object 2, on the basis of the direction of the flick operation (Step 112).

In Step 112, when the direction of the flick operation is the direction of 0° (direction of twelve o'clock), the system controller 32 determines that the flick operation on the shutter object 2 has been detected. Note that the direction of the flick operation does not need to be precisely the direction of 0° and the direction of the flick operation has a certain margin. In this embodiment, when the direction of the flick operation is within a range of ±18° with respect to the direction of 0°, it is determined that the flick operation on the shutter object 2 has been detected.

When the flick operation is the flick operation on the shutter object 2 (YES in Step 112), the system controller 32 performs image pickup using the instant-shutter function (Step 113). In the image pickup using the instant-shutter function, the system controller 32 issues an instruction to the digital-signal processor 37 at a timing when the flick operation is detected, to output image data to the image storage unit 14 from the digital-signal processor 37. The image storage unit 14 stores image data output from the digital-signal processor 37 as still-image data.

In accordance with this processing, the user can perform image pickup using the instant-shutter function, by performing a touch operation on the screen with a finger and performing a flick operation in a predetermined direction (0°±18°) without removing the finger from the screen.

Here, due to a shake of the hand holding the digital camera 100 in the flick operation, the angle of view adjusted by the user while viewing the live view image can be deviated. In order to eliminate the influence of this hand shake, in image pickup using the instant-shutter function, the system controller may perform image pickup after a predetermined time (time (e.g., about 0.5 seconds)) shorter than the shortest count period (1 second) in the self-timer function) elapses after a point of time when the flick operation is detected, not immediately after the flick operation is detected.

When performing image pickup using the instant-shutter function, the system controller 32 returns to Step 104. Then, the system controller 32 determines whether or not the touch operation has been detected again.

When the flick operation is not the flick operation on the shutter object 2 (NO in Step 112), the system controller 32 determines whether or not the flick operation is a flick operation on any one of the timer objects 3 (Step 114).

In Step 114, when the direction of the flick operation is 36°±16°, 72°±16°, 108°±16°, 144°±16°, or 180°±16°, the system controller 32 determines that a flick operation on the first, second, third, fourth, or fifth timer object 3a, 3b, 3c, 3d, or 3e has been detected in the stated order.

When the flick operation on the first, second, third, fourth, or fifth timer object 3a, 3b, 3c, 3d, or 3e has been detected (YES in Step 114), the system controller 32 performs image pickup after 1 second, 2 seconds, 3 seconds, 4 seconds, or 5 seconds after such a flick operation is detected. That is, the system controller 32 performs image pickup using the self-timer function (Step 115).

In image pickup using the self-timer function, the system controller 32 sets in a timer (not shown) a count value that is the number of seconds corresponding to the timer object that is a target of the flick operation when the flick operation is detected. Then, the system controller 32 starts countdown (or countup) by the timer.

Figure 10:
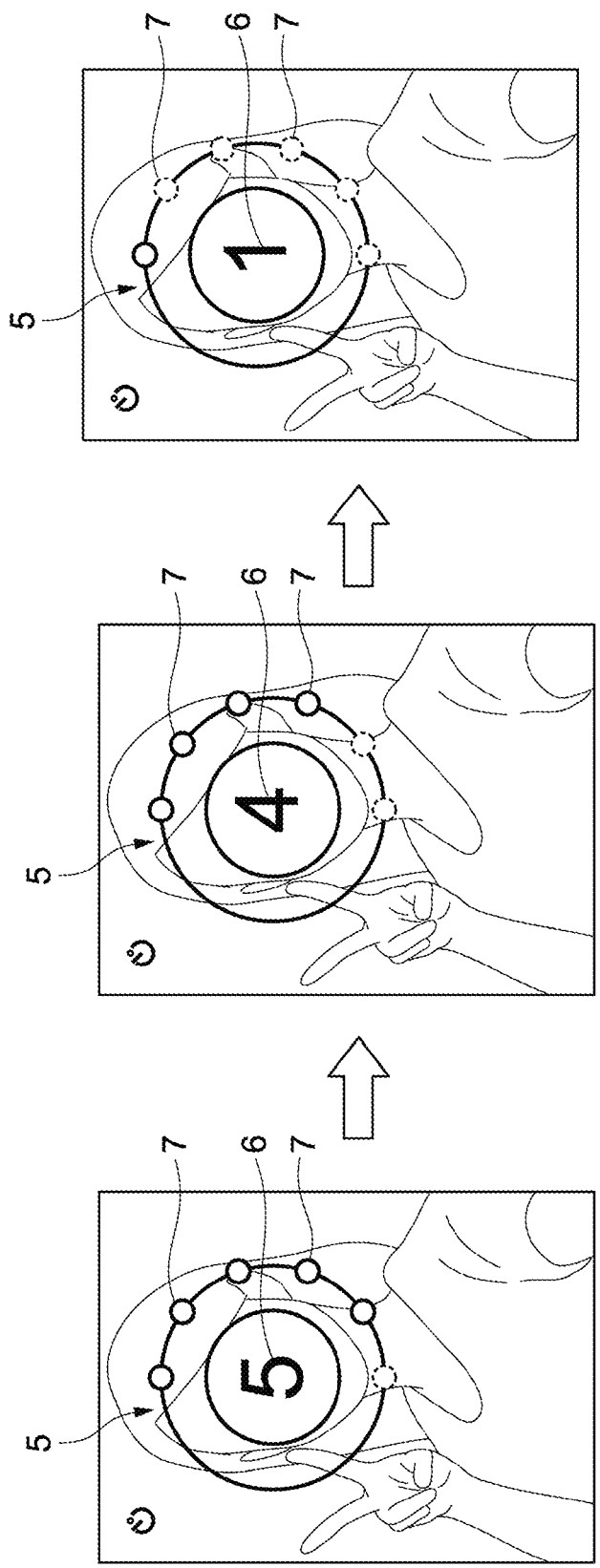
FIG. 10 A view showing an example of a countdown guide displayed superimposed on the live view image.

In the count period of the timer, a countdown guide 5 is displayed superimposed on a preview image. The countdown guide 5 indicates that counting is currently performed. FIG. 10 is a view showing an example of the countdown guide 5. FIG. 10 shows an example of the countdown guide 5 displayed on the screen when a flick operation on a fifth timer object 3e is detected and countdown for 5 seconds is executed.

As in the image pickup guide 1, the countdown guide 5 is located at a position based on a position at which the touch operation has been detected. The countdown guide 5 includes a number object 6 at a center position thereof. The number object 6 indicates the number of remaining seconds until image pickup is performed.

Further, the countdown guide 5 includes countdown objects 7 in a circumference of a circle with the reference point being a center. The countdown objects 7 are arranged at positions corresponding to the positions in the image pickup guide 1, at which the shutter object 2 and the timer objects 3 are arranged. In the example shown in FIG. 10, although the countdown objects 7 are set to be white circle diagrams, any diagrams can be employed for the countdown objects 7.

Display of the countdown objects 7 is changed one by one in a counter-clockwise direction every time the countdown proceeds by 1 second. FIG. 10 shows an example obtained when the white circle diagrams are changed to semi-transparent white circles every time the countdown proceeds by 1 second. Note that a method of changing the display can be appropriately changed. For example, a method in which the countdown objects 7 corresponding to the number of remaining seconds until image pickup is performed are highlighted and the highlighting may be terminated one by one every time the countdown proceeds by 1 second may be used.

By visually recognizing the number object 6 and the countdown objects 7, the user can easily know how many seconds remains until image pickup is performed. Note that, in the example shown in FIG. 10, in order to show the countdown currently performed by the timer to the user, a diagram of a stopwatch is displayed at an upper left position of the screen.

When the timer counts down to zero, the system controller 32 issues an instruction to the digital-signal processor 37 at the timing and causes the digital-signal processor 37 to output the image data to the image storage unit 14. The image storage unit 14 stores image data output from the digital-signal processor 37 as the still-image data.

In accordance with this processing, the user can perform image pickup using the self-timer function by touching the screen with the finger and performing a flick operation in a predetermined direction (36°±16°, 72°±16°, 108°±16°, 144°±16°, 180°±16° without removing the finger from the screen. Further, at this time, the user can arbitrarily select the count period of the timer on the basis of the direction of the flick operation.

When performing image pickup using the self-timer function, then the system controller 32 returns to Step 104 and determines whether or not a touch operation has been detected again.

When the flick operation is not the flick operation on the timer object 3 (NO in Step 114), the system controller 32 determines whether or not the flick operation is a flick operation on the continuous-shooting object 4 (Step 116).

In Step 116, when the direction of the flick operation is within a range of 270°±16°, the system controller 32 determines that the flick operation on the continuous-shooting object 4 has been detected.

When the flick operation is the flick operation on the continuous-shooting object 4 (YES in Step 116), the system controller 32 performs image pickup using the continuous-shooting function (Step 117).

In image pickup using the continuous-shooting function, the system controller 32 issues, first of all, an instruction to the digital-signal processor 37 at a timing when the flick operation is detected and causes the digital-signal processor 37 to output the image data to the image storage unit 14. The image storage unit 14 stores image data output from the digital-signal processor 37 as the still-image data. With this, first still-image data is acquired.

Note that, in image pickup for this first still image, in order to eliminate the influence of a hand shake, image pickup may be performed after a short time (e.g., about 0.5 seconds) elapses after a point of time when the flick operation is detected, not immediately after the flick operation is detected. Alternatively, the image pickup may be performed after a time of approximately 1 second to 5 seconds elapses as in image pickup using the self-timer function.

When the first still image is picked up, the system controller 32 sets in the timer a predetermined count value (e.g., approximately 3 to 5 seconds) and executes countdown (or countup) of the timer. Then, the system controller 32 issues an instruction to the digital-signal processor 37 at a timing when the countdown of the timer ends, and causes the digital-signal processor 37 to output the image data to the image storage unit 14. The image storage unit 14 stores image data output from the digital-signal processor 37 as the still-image data. With this, second still-image data is acquired.

For third or higher-order still images, image pickup is performed as in the second still image. In accordance with this processing, image pickup is continuously performed for a predetermined time duration (first time duration: duration of 3 to 5 seconds). Then, when image pickup for a preset number of (e.g., approximately 5 to 10) still images is completed, the system controller 32 terminates image pickup using the continuous-shooting function and returns to Step 104 again.

In accordance with this processing, the user can perform image pickup using the continuous-shooting function by performing a touch operation on the screen with the finger and performing a flick operation in a predetermined direction) (270°±16° without removing the finger from the screen.

Note that, in this embodiment, in image pickup using the continuous-shooting function, the period from image pickup to next image pickup is set to a relatively long period, i.e., approximately 3 to 5 seconds. Therefore, the user can change the facial expression and the pose in that period.

In the period from image pickup to next image pickup (when the count period equivalent to that in the self-timer function is set in first image pickup, which also includes such a period), a facial expression/pose guide for guiding the user for at least one of the facial expression and the pose may be displayed on the screen.

This facial expression/pose guide is an image of a character (or an image of an existing person) who makes/strikes various facial expressions and various poses. The facial expression/pose guide is displayed superimposed on the live view image at an edge position of the screen, for example.

Alternatively, the facial expression/pose guide is an outline of a feature portion of a facial expression or a pose. In this case, the facial expression/pose guide is displayed at a corresponding position in the subject shown on the screen (e.g., the position of the mouth in the live view image if a feature is in the mouth in the facial expressions).

Examples of the facial expression can include "duck face" (mouth form of widely opening the mouth sideways and slightly pushing out the upper lip like a duck), "sparrow face" (mouth form of slightly opening the mouth and slightly pushing out the lips like a sparrow), "oops face" (expression of looking embarrassed (after failed to do something) and pushing out the tongue), "worried face", and "surprised face".

Further, examples of the pose can include "V-sign", "salute", "pose of putting hands on the cheeks", "silence pose" (pose of putting the index on the nose head), and "cat pose" (pose of lightly closing the fingers such that the palms can be seen and directing the palms to the image pickup unit 21). Note that the facial expression and the pose may be combined (e.g., V-sign with a duck face).

The facial expression/pose guide is sequentially switched to a different facial expression/pose every time image pickup is performed. By making/striking a facial expression and a pose in accordance with the guide, the user can acquire an image of various expressions and poses without being trouble deciding which expression and pose the user makes/strikes next.

Note that, not limited to image pickup using the continuous-shooting function, the facial expression/pose guide may be displayed on the screen also in image pickup using the self-timer function described above. Further, in image pickup using the continuous-shooting function, the count-down guide 5 (see FIG. 10) may be displayed on the screen (without or with the facial expression/pose guide).

In the description here, in image pickup using the continuous-shooting function, the case where the count period of the timer is set in advance has been described. On the other hand, the count period in image pickup using the continuous-shooting function may be determined in a manner that depends on the direction of the flick operation as in the count period associated with the self-timer function. That is, the continuous-shooting function and the self-timer function (in each time) may be combined.

In this case, a plurality of continuous shooting/timer objects (fourth object, fifth object) are arranged at equal intervals (e.g., 36° intervals) in the circumference (e.g., left half) of the image pickup guide 1. Different count periods (first time duration, second time duration) are assigned to the continuous shooting/timer objects.

Then, when a flick operation on one continuous shooting/timer object of the plurality of continuous shooting/timer objects 3 is detected, the system controller 32 sets a count period by the time next image pickup is performed, to a count period corresponding to that continuous shooting/timer object.

For example, if the flick operation corresponding to the continuous shooting/timer object corresponding to 5 seconds has been detected, the system controller 32 may perform image pickup using the continuous-shooting function at 5-second intervals (regarding first image pickup, image pickup may be instantly performed or image pickup may be performed after the count period of 5 seconds elapses). With this, the user can arbitrarily set the intervals in image pickup using the continuous-shooting function in a manner that depends on the direction of the flick operation.

Further, in the description here, the case where the number of still images acquired using the continuous-shooting function is determined in advance has been described. On the other hand, the number of still images may be determined on the basis of the direction of the flick operation.

In this case, in the circumference (e.g., left half) of the image pickup guide 1, a plurality of continuous shooting-number of images objects to which different numbers of images are assigned are arranged at equal intervals (e.g., 36° intervals). Then, when a flick operation on one continuous shooting-number of images object of the plurality of the continuous shooting-number of images objects has been detected, the system controller 32 performs image pickup using the continuous-shooting function until still images whose number corresponds to the continuous shooting-number of images object are acquired. With this, the user can arbitrarily set the number of still images acquired in image pickup using the continuous-shooting function in a manner that depends on the direction of the flick operation.

<Actions, Etc.>

As described above, in this embodiment, the user can perform image pickup (take a selfie) using the instant-shutter function by performing a flick operation on the shutter object 2 of the objects displayed on the screen. Further, the user can perform image pickup (take a selfie) using the self-timer function by performing a flick operation on any one of the timer objects 3.

With this, when taking a selfie, the user can immediately and intuitively select whether to perform image pickup using the instant-shutter function or image pickup using the self-timer function.

In addition, in this embodiment, different count periods are assigned in the plurality of timer objects 3. Therefore, the user can also arbitrarily select the count period associated with the self-timer function in a manner that depends on the direction of the flick operation.

Further, in this embodiment, the user can freely select whether to perform image pickup using the instant-shutter function or image pickup using the self-timer function in every image pickup. Further, the user can also arbitrarily select the count period associated with the self-timer function every time image pickup is performed.

The user can take a selfie while enjoying the digital camera 100 according to this embodiment, and the user's experience is enhanced. In particular, with respect to the digital camera 100 according to this embodiment, operations in taking a selfie are simple and it is also suitable to take a selfie while walking.

Second Embodiment

Next, a second embodiment of the present technology will be described. Note that, in the description of the second embodiment and the higher-order embodiments, respective units having functions and configurations similar to those of the above-mentioned first embodiment will be denoted by identical symbols and descriptions thereof will be omitted or simplified.

Here, as described above, the image pickup guide 1 is displayed with the detection position of the touch operation being a reference point on the screen. Therefore, when a touch operation has been performed on the edge position of the screen, it may be difficult to display the image pickup guide 1 in a circle shape.

In view of this, in the second embodiment, it is assumed that processing, for example, changing the display mode of the image pickup guide 1 is executed in accordance with the detection position of the touch operation (position of the reference point).

Figure 11:
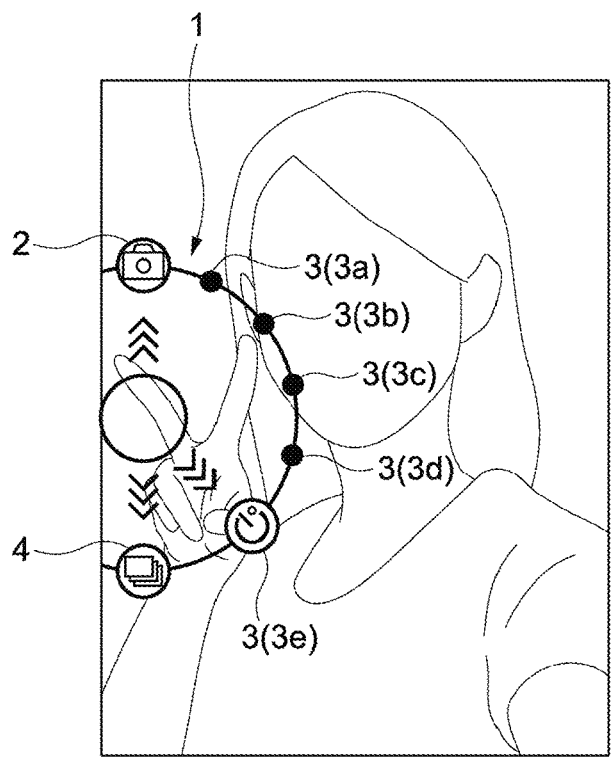
FIG. 11 A View showing an example for changing a display mode of the image pickup guide in a manner that depends on a position at which a touch operation has been detected.
Figure 12:
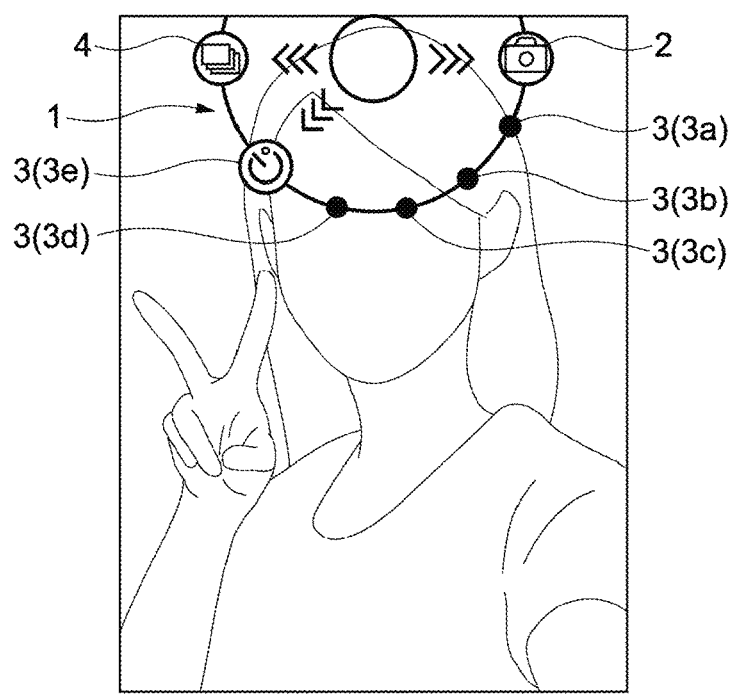
FIG. 12 A view showing an example for changing the display mode of the image pickup guide in a manner that depends on the detection position of the touch operation.
Figure 13:
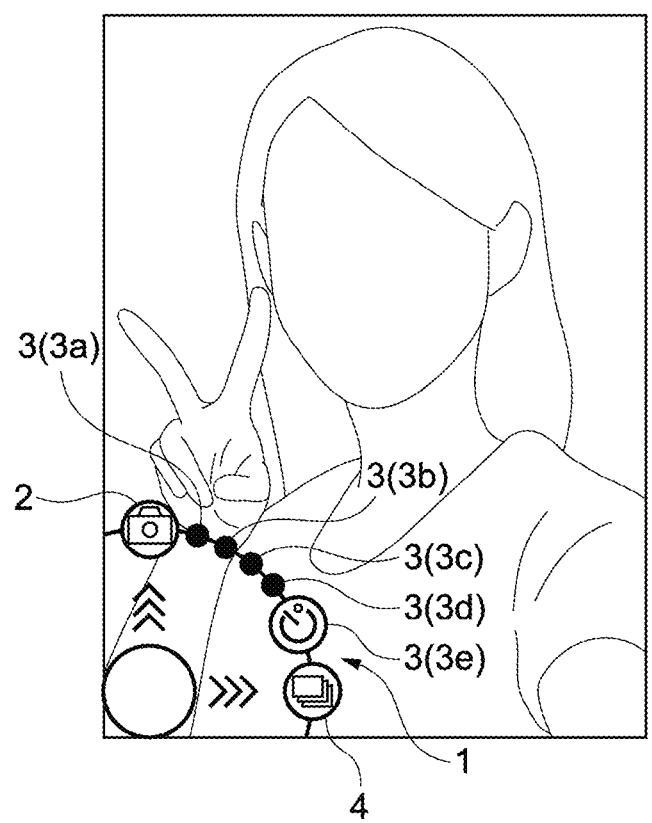
FIG. 13 A view showing an example for changing the display mode of the image pickup guide in a manner that depends on the detection position of the touch operation.

FIGS. 11, 12, and 13 each show an example for changing the display mode of the image pickup guide 1 according to the position at which the touch operation has been detected.

FIG. 11 shows a state on the screen that is obtained when the user performs a touch operation on a portion near a left edge of the screen. As shown in FIG. 11, when a touch operation has been performed on a portion near the left edge, the reference point is set at the touched position and an image pickup guide 1 is displayed at a position corresponding to the reference point. The image pickup guide 1 includes, in a circumference of a right half (circumference of the circular arc), a shutter object 2, five timer objects 3, and a continuous-shooting object 4. In the example shown in FIG. 11, the shutter object 2 is located at a position of 0° (position of twelve o'clock) and the five timer objects 3 are arranged at equal intervals from an upper right portion to a lower left portion. Further, the continuous-shooting object 4 is located at the position of 180° (position of six o'clock). Note that, in the example shown in FIG. 11, regarding the circular arc in which the objects are arranged, a center thereof corresponds to the reference point (the position on which a touch operation has been performed). On the other hand, the center of the circular arc does not necessarily need to correspond to the reference point and the center of the circular arc may be positioned in an area other than the screen, for example. The same applies to FIGS. 12 and 13 described below.

FIG. 12 shows a state on the screen that is obtained when the user performs a touch operation in the vicinity of an upper edge of the screen. As shown in FIG. 12, when a touch operation has been performed in the vicinity of the upper edge, the shutter object 2, the five timer objects 3, and the continuous-shooting object 4 are arranged in a circumference of the lower half (circumference of the circular arc). In the example shown in FIG. 12, the shutter object 2 is located at a position of 90° (position of three o'clock) and the five timer objects 3 are arranged at equal intervals from a lower right portion to a lower left portion. Further, continuous-shooting object 4 is located at the position of 270° (position of nine o'clock).

FIG. 13 shows a state on the screen when the user has been performed the touch operation near a lower left end of the screen. As shown in FIG. 13, when a touch operation has been performed near the lower left end, the shutter object 2, the five timer objects 3, and the continuous-shooting object 4 are arranged in a ¼ circumference of an upper right portion (in a circumference of the circular arc). In the example shown in FIG. 13, the shutter object 2 is located at a position of 0° (position of twelve o'clock) and the five timer objects 3 are arranged at equal intervals in the circumference of an upper right. Further, the continuous-shooting object 4 is located at a position of 90° (position of three o'clock).

Here, as FIG. 9 is compared to FIGS. 11 to 13, relative positions of the shutter object 2, the five timer objects 3, and the continuous-shooting object 4 change while these relative positions of them can be kept as much as possible. Further, the intervals among the five timer objects 3 are kept as much as possible. Therefore, the user can perform an operation on each object with a stable operation feeling irrespective of the position of the touch operation.

Note that, in the examples shown in FIGS. 11 to 13, the position of each object 2, 3, or 4 relative to the position of the reference point changes. Therefore, the direction of the flick operation in the determination as to whether or not an operation on each object 2, 3, or 4 has been performed also changes as a matter of course.

As another example for changing the display mode of the image pickup guide 1, a method of changing the entire size of the image pickup guide 1 in a manner that depends on the position of the touch operation is exemplified. In this case, as the position of the touch operation becomes closer to the edge, the entire size of the image pickup guide 1 becomes smaller (here, the directions in which the objects are arranged with respect to the reference point do not change).

Various Modified Examples

[Functions Assigned to Image Pickup Guide 1]

In the above-mentioned embodiments, the case where the instant-shutter function, the self-timer function, and the continuous-shooting function are assigned in the image pickup guide 1 has been described. On the other hand, the continuous-shooting function does not necessarily needs to be assigned and may be omitted. Further, instead of the continuous-shooting function (or in addition to the continuous-shooting function), other functions may be assigned in the image pickup guide 1.

A flashlight image pickup function is exemplified as other functions that can be assigned in the image pickup guide 1. In this case, a flashlight object (sixth object) is located in the circumference of the image pickup guide 1 (e.g., position of 270°).

Then, when a flick operation on the flashlight object has been detected, the system controller 32 causes the image pickup unit 21 to perform image pickup while causing the flashlight 22 to emit light (instant shutter).

Further, the flashlight image pickup function can also be combined with the self-timer function (in each time). In this case, for example, a plurality of flash/timer objects are arranged at equal intervals in the circumference (e.g., left half) of the image pickup guide 1. In the plurality of flash/timer objects, different count periods are set. Then, when the flick operation is detected, the count period of the number of seconds corresponding to the flash/timer object that is a target for the flick operation is set and the flashlight image pickup is performed at the end of the countdown.

In addition, the flashlight image pickup function and the continuous-shooting function can also be combined. In this case, for example, the flash/continuous-shooting object is located in the circumference of the image pickup guide 1 (e.g., position of 270°). Then, when a flick operation on the flash/continuous-shooting object is detected, the flashlight image pickup is continuously performed in a predetermined time duration (duration of 3 to 5 seconds).

The flashlight image pickup function, the continuous-shooting function, and the self-timer function (in each time) can also be combined. In this case, for example, a plurality of flash/continuous shooting/timer objects are arranged in the circumference (e.g., left half) of the image pickup guide 1 at equal intervals. Different count periods are set in the plurality of flash/continuous shooting/timer objects. Then, when a flick operation is detected, flashlight image pickup is performed for each count period corresponding to the flash/continuous shooting/timer object that is a target of the flick operation.

Further, the shutter speed adjustment function, the zoom ratio adjustment function, the focus position adjustment function, the degree-of-opening adjustment function of the diaphragm 24, the luminance adjustment function, and the white balance adjustment function are exemplified as other functions that can be assigned in the image pickup guide 1.

The shutter speed adjustment function of the various adjustment functions will be described as a representative. In this case, a plurality of shutter speed objects corresponding to the shutter speeds are arranged at equal intervals in the circumference (e.g., left half) of the image pickup guide 1. Then, when the flick operation is detected, the shutter speed is set to a value corresponding to the shutter speed object that is a target for the flick operation.

The user performs a touch operation on the screen to display the image pickup guide 1. The user performs a flick operation on an arbitrary shutter speed object of a plurality of shutter speed objects. With this, the user can set the shutter speed to the arbitrary shutter speed. After that, the user can perform image pickup at the set shutter speed by performing a touch operation on the screen again to display the image pickup guide 1 and performing a flick operation on the shutter object 2 (or the timer objects 3, the continuous-shooting object 4, etc.).

Note that the same concept as the shutter speed adjustment function is applicable to the zoom ratio adjustment function, the focus position adjustment function, the degree-of-opening adjustment function of the diaphragm 24, the luminance adjustment function, and the white balance adjustment function, and hence detailed descriptions thereof are omitted.

Here, various functions can be thus assigned in the image pickup guide 1. Therefore, it is predictable that all the functions cannot be arranged by only one image pickup guide 1. Therefore, a plurality of image pickup guides 1 to which different functions are assigned may be prepared. In this case, different image pickup guides 1 may be displayed on the screen according to a user's operation.

For example, when a touch operation or a tap operation (operation of touching the screen and immediately removing the finger from the screen) is detected, the first image pickup guide 1 is displayed on the screen. Then, when a double operation (operation of repeating tap operation twice) is detected, the second image pickup guide 1 is displayed on the screen. Similarly, when an n-number of tap operations are detected, an nth image pickup guide 1 is displayed on the screen.

Note that at least the instant-shutter function and the self-timer function are assigned to a first image pickup guide 1 of the plurality of image pickup guides 1. Here, the continuous-shooting function, the flashlight image pickup function (or a combination of at least two of a self-timer function, a continuous-shooting function, and a flashlight image pickup function) are functions related to the action of performing image pickup.

Therefore, typically, the first image pickup guide 1 is preferentially assigned to these functions. Alternatively, when it is not assigned to the first image pickup guide 1, that function is assigned to a second image pickup guide 1, a third image pickup guide 1 . . . .

On the other hand, the shutter speed adjustment function, the zoom ratio adjustment function, the focus position adjustment function, the degree-of-opening adjustment function of the diaphragm 24, the luminance adjustment function, and the white balance adjustment function are functions indirectly related to image pickup, not functions directly related to the action of performing image pickup.

Therefore, regarding the various adjustment functions above, they have lower priorities than those of functions directly related to image pickup and are typically assigned to the image pickup guide 1 after the functions directly related to image pickup. For example, when assignment of the functions directly related to image pickup has been completed in the third image pickup guide 1, the above-mentioned adjustment functions are assigned in a fourth image pickup guide 1, a fifth image pickup guide 1 . . . .

[Displaying and Erasing Timings of Image Pickup Guide 1]

In the above-mentioned examples, the case where the image pickup guide 1 is erased from the screen at the timing when the touch operation was released has been described. On the other hand, when the touch operation is released and the image pickup guide 1 is nevertheless not erased and a touch operation is performed on a position other than the position in which the image pickup guide 1 is being displayed, the image pickup guide 1 may be erased from the screen.

Further, in the above-mentioned examples, the case where the image pickup guide 1 is displayed on the screen at the timing when the touch operation is detected has been described. However, the image pickup guide 1 may be constantly displayed in a predetermined position of the screen (e.g., edge position of the screen) on the selfie mode.

[Relationship between Position of Touch Operation and Display Position of Image Pickup Guide 1]

In the above description, the case where the image pickup guide 1 is displayed on the basis of the position at which the touch operation has been detected has been described. However, the image pickup guide 1 may be displayed at a position irrelevant to the position at which the touch operation has been detected. For example, the image pickup guide 1 may be displayed at a position set in advance, for example, the center of the screen or the edge position of the screen irrespective of the position at which the touch operation has been detected. Note that, in this case, the image pickup guide 1 is not erased from the screen even when the touch operation is released.

[Operations on Objects]

In the above examples, the description has been made by exemplifying the flick operation toward any one of the arranged objects as an example of the user's operation on each object. On the other hand, the operation on each object is not limited to the flick operation. For example, the user's operation may be an operation of continuously sliding the finger from the reference point to the position of each object.

Alternatively, the user's operation on each object may be a touch operation, a tap operation, or a double tap operation on each object. Note that, in this case, the image pickup guide is constantly displayed on the screen or erased from the screen when a touch operation is performed on a position other than the position in which the image pickup guide 1 is being displayed (when the operation on each object is not performed).

Alternatively, the user's operation on each object may be an operation of sliding the finger along the circumference and removing (or stopping) the finger at the position at which an arbitrary object is being displayed. Referring to FIG. 9, for example, the user may perform a touch operation on the position at which the shutter object 2 is being displayed, and then slide the finger in the clockwise direction along the circumference, and remove the finger at a position at which an arbitrary timer object 3 is being displayed. Alternatively, the user may perform a touch operation on the position at which the fifth timer object 3e is being displayed, and then slide the finger in the counter-clockwise direction along the circumference, and remove the finger at a position at which an arbitrary timer object 3 is being displayed.

Note that, also in this case, the image pickup guide 1 is constantly displayed on the screen or erased from the screen when a touch operation is performed on a position other than the position in which the image pickup guide 1 is being displayed (when the operation on each object is not performed).

Alternatively, the user's operation on each object may be a combination of an operation of sliding the finger from the reference point to the position of the object and an operation of sliding the finger along the circumference. Referring to FIG. 9, for example, the user may slide the finger from the reference point to a position at which the shutter object 2 is being displayed, and thereafter slide the finger in the clockwise direction along the circumference and perform an operation of removing the finger at the position at which an arbitrary timer object 3 is being displayed. Alternatively, the user may slide the finger from the reference point to the position at which the fifth timer object 3e is being displayed, and thereafter slide the finger in the counter-clockwise direction along the circumference and perform an operation of removing the finger at the position at which an arbitrary timer object 3 is being displayed.

Note that, in this case, any timings of the above-mentioned various examples can be used as the displaying timing and the erasing timing of the image pickup guide 1.

[Gesture Operation]

In the above examples, the description has been made by exemplifying the operations on the screen as a user's operation (predetermined user's operation) for displaying (invoking) the image pickup guide 1 on the screen and the user's operation on each object. However, a gesture operation at a position spaced away from the screen may be used instead of the user's operation on the screen.

Note that, when an input using the gesture operation is performed, the digital camera 100 may be placed at an arbitrary position and a selfie may be taken at a position spaced away from the digital camera 100 without needing to perform image pickup while holding the digital camera 100 in the hand.

Here, examples of a gesture operation for displaying (invoking) the image pickup guide 1 on the screen can include a motion of repeating a motion of drawing a circle with the finger or a motion of opening the closed hand. Alternatively, the gesture operation may be a motion of quickly repeating a wink.

Further, examples of the gesture operation on the object can include a motion of swinging the arm toward an arbitrary arranged object from the reference point and a motion of putting the finger on the position at which an arbitrary object is being displayed and drawing a circle with the finger. Alternatively, the gesture operation may be a motion of directing the line of sight to an arbitrary displayed object.

The operation methods described in the above section "Operations on Objects" are all applicable to the gesture operations. For example, the user may move the arm to move the finger tip from the reference point to the position at which the shutter object 2 is being displayed, and thereafter move the finger tip in the clockwise direction along the circumference to draw a circle with the finger at a position at which an arbitrary timer object 3 is being displayed.

Note that, in detection of the gesture operation, the system controller 32 only needs to determine whether or not the gesture operation has been performed, on the basis of the image captured by the image pickup unit 21.

Here, when taking a selfie, the user needs to perform image pickup while striking a pose, and hence the user is sometimes required to perform an operation on the screen in a difficult posture. However, the use of the gesture operation releases the user from the operation of touching the screen, and hence the user can try to perform image pickup at a free angle, which reduces the load on the body.

[Remote Operation]

The digital camera 100 may be placed at a predetermined position and a selfie may be taken by another apparatus performing a remote control. For example, a description will be made exemplifying a smartphone (image pickup control apparatus) including a communication unit and a display unit as the other apparatus for performing the remote control. By using a wireless LAN function (e.g., Wi-Fi) of the communication unit, the smartphone is capable of sending and receiving information to/from the digital camera 100.

The digital camera 100 sends image data captured by the image pickup unit 21 to a smartphone via the communication unit 17. The smartphone displays the received image data as the live view image on the screen of the display unit. In addition, the smartphone displays the image pickup guide 1 superimposed on the live view image. The user can take a selfie by operating the image pickup guide 1 displayed on the screen of the smartphone.

When an operation on any one of the objects such as the shutter object 2, the timer objects 3, and the continuous-shooting object 4 is detected, the smartphone issues an instruction to the digital camera 100 to perform image pickup using the instant-shutter function, the self-timer function, or the continuous-shooting function. The digital camera 100 performs image pickup using the instant-shutter function, the self-timer function, or the continuous-shooting function according to the instruction.

Note that, when the digital camera 100 is placed at a predetermined position and a selfie is taken through a gesture operation or a remote operation, it is not limited to image pickup performed by the user alone or several people including the user, and image pickup can also be performed by a group of many people including the user in a tourist resort.

[Other Examples of Image Pickup Control Apparatus]

In the above description, the digital camera 100 and the smartphone have been shown as examples of the image pickup control apparatus. However, the image pickup control apparatus is not limited thereto. For example, the image pickup control apparatus may be a PC (Personal Computer), a television apparatus, a portable game console, or a game console.

The present technology can also take the following configurations.

(1) An image pickup control apparatus, including
  a control unit that
    displays an image pickup guide including a first object, a second object, and a third object on a screen of a display unit,
    makes a determination as to detection of user's operations on the first object, the second object, and the third object, causes, when the user's operation on the first object has been detected, the image pickup unit to perform image pickup, causes, when the user's operation on the second object has been detected, the image pickup unit to perform image pickup after a first time elapses after the user's operation is detected, and causes, when the user's operation on the third object has been detected, the image pickup unit to perform image pickup after a second time different from the first time elapses after the user's operation on the third object is detected.

(2) The image pickup control apparatus described according to (1), in which the image pickup guide includes the first object, the second object, and the third object in a circumference of a circle or a circular arc corresponding to a reference point set within the screen.

(3) The image pickup control apparatus described according to (2), in which the control unit determines, when a user's operation from the reference point toward the first object has been detected, that the user's operation on the first object has been detected, determines, when a user's operation from the reference point toward the second object has been detected, that the user's operation on the second object has been detected, and determines, when a user's operation from the reference point toward the third object has been detected, that the user's operation on the third object has been detected.

(4) The image pickup control apparatus described according to (2) or (3), in which the control unit determines whether or not the predetermined user's operation has been detected, and displays the image pickup guide on the screen when the predetermined user's operation has been detected.

(5) The image pickup control apparatus described according to (4), in which the control unit determines, when the predetermined user's operation has been detected, a position within the screen at which the predetermined user's operation has been detected, and sets the reference point to position at which the predetermined user's operation has been detected.

(6) The image pickup control apparatus described according to (4) or (5), in which the control unit changes a display mode of the image pickup guide according to a position within the screen at which the predetermined user's operation has been detected.

(7) The image pickup control apparatus described according to (5), in which the control unit displays the image, which is captured by the image pickup unit, on the screen as the live view image, and displays the image pickup guide superimposed on the live view image.

(8) The image pickup control apparatus described according to (7), in which the control unit controls the image pickup unit to focus on a position of a subject in the live view image, the position corresponding to a position within the screen at which the predetermined user's operation has been detected.

(9) The image pickup control apparatus described according to any one of (1) to (8), in which the image pickup guide includes a fourth object, and the control unit makes a determination as to detection of the user's operation on the fourth object, and causes, when the operation on the fourth object has been detected, the image pickup unit to continuously perform image pickup in a first time duration.

(10) The image pickup control apparatus described according to (9), in which the control unit displays a facial expression/pose guide on the screen, the facial expression/pose guide guiding the user for at least one of a facial expression and a pose within the first time duration.

(11) The image pickup control apparatus described according to (9) or (10), in which the image pickup guide includes a fifth object, and the control unit makes a determination as to the user's operation on the fifth object, and causes, when the user's operation on the fifth object has been detected, the image pickup unit to continuously perform image pickup in a second time duration different from the first time duration.

(12) The image pickup control apparatus described according to any one of (1) to (11), in which the image pickup guide includes a sixth object, and the control unit determines whether or not a user's operation on the sixth object has been detected, and causes, when an operation on the sixth object has been detected, the image pickup unit to perform image pickup while causing a flashlight to emit light.

(13) An image pickup control method, including:

displaying an image pickup guide including a first object, a second object, and a third object on a screen of a display unit;

making a determination as to detection of user's operations on the first object, the second object, and the third object;

causing, when the user's operation on the first object has been detected, the image pickup unit to perform image pickup;

causing, when the user's operation on the second object has been detected, the image pickup unit to perform image pickup after a first time elapses after the user's operation is detected; and causing, when the user's operation on the third object has been detected, the image pickup unit to perform image pickup after a second time different from the first time elapses after the user's operation on the third object is detected.

(14) A program that causes an image pickup control apparatus to execute the steps:

displaying an image pickup guide including a first object, a second object, and a third object on a screen of a display unit;

making a determination as to detection of user's operations on the first object, the second object, and the third object;

causing, when the user's operation on the first object has been detected, the image pickup unit to perform image pickup;

causing, when the user's operation on the second object has been detected, the image pickup unit to perform image pickup after a first time elapses after the user's operation is detected; and causing, when the user's operation on the third object has been detected, the image pickup unit to perform image pickup after a second time different from the first time elapses after the user's operation on the third object is detected.

REFERENCE SIGNS LIST 1 image pickup guide
2 shutter object 3 timer object
4 continuous-shooting object
5 countdown guide
6 number object
7 countdown object
10 digital camera main body
11 display unit
12 touch sensor
13 shutter button
20 rotator
21 image pickup unit
22 flashlight
31 control unit
32 system controller
100 digital camera

The invention claimed is:
1. An image pickup control apparatus, comprising:
an image sensor;
a display screen; and
a central processing unit (CPU) configured to:
control the display screen to concurrently display a first object, a second object, a third object, and guide marks based on a touch operation on the display screen, wherein the guide marks are configured to guide a user's sliding operation to the first object, the second object, and the third object, respectively;
control the image sensor to capture an image, based on a first sliding operation from a position of the touch operation to the first object displayed on the display screen;
control the image sensor to capture the image after an elapse of a first time, based on a second sliding operation from the position of the touch operation to the second object displayed on the display screen; and
control the image sensor to capture the image after an elapse of a second time different from the elapse of the first time, based on a third sliding operation from the position of the touch operation to the third object displayed on the display screen.

2. The image pickup control apparatus according to claim 1, wherein the CPU is further configured to control the display screen to display the first object, the second object, and the third object in one of a circumference of a circle or a circular arc.

3. The image pickup control apparatus according to claim 2, wherein
the one of the circle or the circular arc includes a reference point within the display screen, and
the CPU is further configured to control the image sensor to capture the image, based on the first sliding operation from the reference point toward a position of the first object.

4. The image pickup control apparatus according to claim 3, wherein the CPU is further configured to control the display screen to display the first object, the second object, and the third object based on a specific user operation on the display screen.

5. The image pickup control apparatus according to claim 4, wherein the CPU is further configured to set the reference point at a first position within the display screen based on the specific user operation.

6. The image pickup control apparatus according to claim 5, wherein the CPU is further configured to set an entire display mode of the first object, the second object, and the third object to a specific display mode, and wherein the specific display mode corresponds to the first position within the display screen.

7. The image pickup control apparatus according to claim 1, wherein the CPU is further configured to:
control the display screen to display the image, acquired by the image sensor, as a live view image; and
control the display screen to concurrently display the first object, the second object, and the third object with the live view image.

8. The image pickup control apparatus according to claim 7, wherein the CPU is further configured to:
control the display screen to display the first object, the second object, and the third object based on a specific user operation at a first position within the display screen; and
control the image sensor to focus on a second position of a subject in the live view image, based on the first position within the display screen, wherein the second position corresponds to the first position of the specific user operation.

9. The image pickup control apparatus according to claim 1, wherein the CPU is further configured to control the image sensor to continuously execute image pickup in a first time duration, based on a user operation on a fourth object displayed on the display screen.

10. The image pickup control apparatus according to claim 9, wherein the CPU is further configured to control the display screen to display a guide in the first time duration, wherein the guide indicates at least one of a facial expression or a pose.

11. The image pickup control apparatus according to claim 9, wherein the CPU is further configured to control the image sensor, to continuously execute the image pickup in a second time duration different from the first time duration, based on a fifth user operation on a fifth object displayed on the display screen.

12. The image pickup control apparatus according to claim 1, wherein the CPU is further configured to control the image sensor, to capture the image based on emission of light from a flashlight, based on a fourth user operation on a sixth object displayed on the display screen.

13. An image pickup control method, comprising
controlling a display screen to concurrently display a first object, a second object, a third object, and guide marks based on a touch operation on the display screen, wherein the guide marks are configured to guide a user's sliding operation to the first object, the second object, and the third object, respectively;
controlling an image sensor to capture an image, based on a first sliding operation from a position of the touch operation to the first object displayed on the display screen;
controlling the image sensor, to capture the image after an elapse of a first time, based on a second sliding operation from the position of the touch operation to the second object displayed on the display screen; and
controlling the image sensor, to capture the image after an elapse of a second time different from the elapse of the first time, based on a third sliding operation from the position of the touch operation to the third object displayed on the display screen.

14. A non-transitory computer-readable medium having stored thereon, computer-readable instructions, which when executed by a computer, cause the computer to execute operations, the operations comprising:

controlling a display screen to concurrently display a first object, a second object, a third object, and guide marks based on a touch operation on the display screen, wherein the guide marks are configured to guide a user's sliding operation to the first object, the second object, and the third object, respectively;

controlling an image sensor to capture an image, based on a first sliding operation from a position of the touch operation to the first object displayed on the display screen;

controlling the image sensor, to capture the image after an elapse of a first time, based on a second sliding operation from the position of the touch operation to the second object displayed on the display screen; and controlling the image sensor, to capture the image after an elapse of a second time different from the elapse of the first time, based on a third sliding operation from the position of the touch operation to the third object displayed on the display screen.

15. The image pickup control apparatus according to claim 1, wherein the display screen and the image sensor are on a same side of the image pickup control apparatus.

16. An image pickup control apparatus, comprising:
an image sensor;
a display screen; and
a central processing unit (CPU) configured to:
control the image sensor to capture an image, based on a first user operation on a first object displayed on the display screen;
control the image sensor to capture the image after an elapse of a first time, based on a second user operation on a second object displayed on the display screen;
control the image sensor to capture the image after an elapse of a second time different from the elapse of the first time, based on a third user operation on a third object displayed on the display screen;
control the image sensor to continuously execute image pickup in a first time duration, based on a fourth user operation on a fourth object displayed on the display screen; and
control the display screen to display a guide in the first time duration, wherein the guide is configured to guide a user for at least one of a facial expression or a pose.

* * * * *